UNITED STATES PATENT OFFICE 2,606,927

CATALYTIC REDUCTION OF DICARBO-CYCLIC DIAMINES

Archie E. Barkdoll, Wilmington, and Gerald M. Whitman, Claymont, Del., assignors to E. I. du Pont de Nemours & Company, Wilmington, Del., a corporation of Delaware No Drawing. Application October 21, 1946, Serial No. 704,796

7 Claims. (Cl. 260—563)

This invention relates to hydrogenation processes and more particularly to a catalytic method for hydrogenating certain dicarbocyclic diamines.

It is known to hydrogenate aromatic amines to the corresponding alicyclic amines using base and noble metal catalysts. As a rule good results are obtained with monocyclic aromatic amines, but when attempts are made to hydrogenate non-condensed ring polycyclic aromatic amines with base metal catalysts, the yields are generally poor. The use of platinum requires employment of an acid medium which frequently leads to the formation of undesired products. Furthermore the use of platinum increases the overall cost of the process, since the hydrogenation has to be carried out in an acid medium and the amine has to be liberated from its salt after hydrogenation. Ruthenium is an exceptionally selective and efficient catalyst for the ring hydrogenation of non-condensed ring polycyclic aromatic amines, but it is scarce and expensive.

It is an object of this invention to provide an improved method for hydrogenating dicarbocyclic diamines containing at least one benzene nucleus and having the carbocyclic nuclei separated by at least one acyclic carbon atom. A further object of this invention is to provide a process for hydrogenating dicarbocyclic diamines of the above type with good yields to the corresponding alicyclic compounds. A still further object is to provide an efficient and economical process for the catalytic ring hydrogenation of certain dicarbocyclic diamines in which the carbon rings are benzene nuclei. Other objects will appear hereinafter.

These objects are accomplished by the following invention which comprises reacting hydrogen with a dicarbocyclic diamine containing at least one benzene nucleus and having the carbocyclic nuclei separated by at least one acyclic carbon atom, at a temperature of 225° to 300° C. under a pressure of at least 500 atmospheres, in the presence of 2 to 20 moles of anhydrous ammonia per mole of diamine and in the presence of a hydrogenation catalyst containing as the active constituent a member selected from the group consisting of nickel and cobalt.

A preferred embodiment of this invention comprises heating a dicarbocyclic diamine in which the carbon rings are benzene nuclei and are separated by at least one acyclic carbon atom with hydrogen, at a temperature in the range of 250° to 275° C. under a total pressure in excess of 500 atms., in the presence of a nickel or cobalt hydrogenation catalyst and anhydrous ammonia in amount of 4 to 16 moles of ammonia per mole of dicarbocyclic diamine.

One embodiment of this invention involves the catalytic ring hydrogenation of dicarbocyclic diamines of the general formula

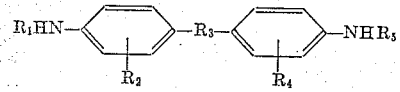

wherein $R_1$ and $R_5$ are members of the group consisting of hydrogen atoms and alkyl radicals containing less than 7 carbon atoms, $R_2$ and $R_4$ are members of the group consisting of hydrogen atoms and alkyl and alkoxy radicals attached to a carbon atom in each ring, said alkyl and alkoxy radicals containing less than 7 carbon atoms, and $R_3$ is a saturated divalent acyclic radical containing at least one carbon atom in the chain.

Another embodiment of the invention involves the catalytic ring hydrogenation of dicarbocyclic diamines of the general formula

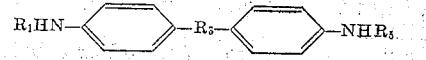

wherein $R_1$ and $R_5$ are members of the group consisting of hydrogen atoms and alkyl radicals containing less than 7 carbon atoms, and $R_3$ is a saturated divalent acyclic hydrocarbon radical containing not more than six carbon atoms.

A further embodiment of the invention involves the catalytic ring hydrogenation of dicarbocyclic diamines of the general formula

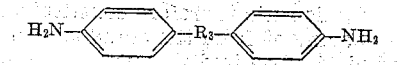

wherein $R_3$ is a saturated divalent acyclic hydrocarbon radical containing not more than six carbon atoms.

A still further embodiment involves the catalytic ring hydrogenation of dicarbocyclic diamines having the general formula

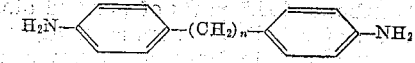

wherein $n$ is a positive integer not greater than six.

In a preferred method for batch-wise operation of the process of this invention a pressure reactor is charged with the diamine to be hydrogenated, the cobalt or nickel catalyst, and if desired a volatile organic solvent. The reactor is then cooled to below 0° C. and anhydrous ammonia is bled into the reactor in an amount corresponding to between 2 and 20 moles per mole of diamine. Hydrogen is then injected, the reaction mixture is heated with agitation to a temperature range between 225° to 300° C. and the pressure adjusted by further injection of hydrogen to the pressure selected for conducting the reaction. A total pressure is maintained throughout the reaction period of at least 500 atms. by periodically injecting hydrogen as needed. After reaction is complete, as evidenced by cessation of hydrogen absorption, the reactor is allowed to cool, opened, the contents discharged and then filtered to separate the catalyst. The product is isolated by distillation or other means known to the art.

The process of this invention is a liquid phase operation and it can be carried out continuously or semi-continuously as well as batch-wise. The process is operated under a total pressure of at least 500 atms. However, as a rule pressures around 1000 atms. are used. The upper pressure limit is not critical and is restricted only by the structural limitations of the equipment used. For practical considerations, however, 20,000 lbs./sq. in. represents the upper pressure limit.

Temperatures above 275° C. and as high as 300° C. can be employed in the practice of this invention. However, at 300° C. the yield of desired diamine is appreciably sacrificed. Accordingly, it is desirable to operate at temperatures below 300° C. and the range within which the best yields are obtained is 250° to 275° C. This range constitutes the preferred operating temperature conditions.

As a rule, an amount of nickel or cobalt catalyst is used sufficient to provide from 2 to 20% and preferably from 5 to 10% of the active catalytic component by weight of the diamine being hydrogenated. The amount of ammonia per mole of diamine being hydrogenated will vary from 2 to 20 moles. Generally, however, good results are obtained employing from 4 to 16 moles of anhydrous ammonia per mole of diamine and this ratio therefore constitutes a preferred embodiment from the standpoint of economy and yield of desired products.

The following examples are submitted to further illustrate this invention. Unless otherwise stated parts are by weight.

Example I

Twenty-five parts of purified bis(4-aminophenyl)methane, 103.5 parts of purified dioxane and 5 parts of cobalt-on-alumina catalyst prepared as described in Example B are charged into a pressure reactor. The reactor is cooled and evacuated, pressured with hydrogen and vented twice, and then 18 parts of anhydrous ammonia is injected into the reaction mixture. After pressuring to 250 atm. with hydrogen and increasing the temperature to 250° C., the hydrogen pressure is increased to 950 atm., and these conditions are essentially maintained for 3 hours with agitation. After cooling and venting the reactor, the reaction product is rinsed from the reactor with methanol, and the solution filtered to remove the catalyst. On distillation, 13.9 parts (52.4% yield) of bis(4-aminocyclohexyl)methane boiling at 112° C./0.6 mm. to 137° C./0.9 mm. is obtained in the form of a clear, colorless syrup which solidifies on standing; neutral equivalent 107.5; $n_D^{27}$ 1.5014.

In addition to bis(4-aminocyclohexyl)methane, there is obtained 7.7 parts of polymeric, nonvolatile solid product and 0.8 part of a basic liquid boiling at 103° C./0.7 mm.–112° C./0.6 mm., which the neutral equivalent of 147.7 indicates to have been formed from bis(4-aminophenyl)methane by hydrogenation and hydrogenolysis.

The effect of variations in the ratio of ammonia to bis(4-aminophenyl)methane, catalyst concentration, temperature, pressure, and concentration of bis(4-aminophenyl)methane on yield of desired bis(4-aminocyclohexyl)methane is shown in the table below:

| Parts of bis(4-aminophenyl)methane | Parts of Dioxane | Parts of Cobalt-on-Alumina Catalyst [1] | Parts of Ammonia | Temp., °C. | Press., Atm. | Percent Yield of bis(4-aminocyclohexyl)methane |
|---|---|---|---|---|---|---|
| 49.5 | 100 | 5 | 17.0 | 250 | 950 | 35.1 |
| 25.7 | 100 | 5 | 9.0 | 250 | 950 | 31.7 |
| 25.7 | 100 | 5 | 36.0 | 275 | 1,000 | 44.9 |
| 49.5 | 50 | 10 | 17.0 | 275 | 955 | 24.0 |
| 25.7 | 100 | 5 | 19.0 | 250 | 960 | 33.1 |

[1] Catalyst contains 37% cobalt.

Example II

A mixture of 25 parts of 4(p-aminobenzyl)-cyclohexylamine, 103.5 parts of dioxane, 5 parts of cobalt-on-alumina catalyst prepared as described in Example B and 18 parts of anhydrous ammonia is hydrogenated in a pressure reactor with agitation at 250° C. and 925 atm. for three and one-quarter hours. After cooling and venting, the reaction mixture is rinsed from the reactor with methanol, the catalyst removed by filtration, and the products isolated by distillation in vacuo. There is obtained a total of 13.2 parts (51.4% yield) of bis(4-aminocyclohexyl)-methane comprised of the following fractions:

*Fraction I.*—10.4 parts; B. P. 114–122° C./0.8 mm.; $n_D^{27}$ 1.5006; neutral equivalent 103.1.

*Fraction II.*—2.8 parts; B. P. 122° C./0.8 mm.–129.5° C./1.1 mm.; $n_D^{27}$ 1.5014; neutral equivalent 107.8.

In addition, 0.5 part of a basic liquid boiling at 93.7–114° C./0.8 mm.; neutral equivalent 186.4; and 6.8 parts of nonvolatile polymeric product is obtained.

Example III

A mixture of 100 parts of purified bis(4-aminophenyl)methane, 15 parts of cobalt-on-alumina catalyst, prepared according to Example B, and 60 parts of anhydrous ammonia is hydrogenated in a pressure reactor with agitation for 2 hours at 300° C. and 940 atm. pressure. The reactor is cooled to room temperature and vented, the product rinsed from the reactor with methanol and the catalyst removed by filtration. On distillation there is obtained 16.8 parts of a product boiling at 113.2° C./0.8 mm.–125° C/1.5 mm., having $n_D^{25}$ 1.5048 and a neutral equivalent of 109.7. This product is somewhat impure bis(4-aminocyclohexyl)methane. From the weight of the product the yield is calculated to be 15.8%.

Example IV

One hundred parts of purified bis(4-aminophenyl)methane, 10 parts of alloy-skeleton nickel catalyst, prepared according to Example A, and 17 parts of anhydrous ammonia are charged into a pressure reactor and hydrogenated with shaking for 3 hours at 250° C. and 975 atm. pressure. From the reaction products there is obtained 42.3 parts (39.9% yield) of bis(4-aminocyclohexyl)methane boiling at 110° C./0.5 mm. to 124° C./0.7 mm.; $n_D^{26}$ 1.5023; neutral equivalent 106.4.

It is to be understood that within the scope of this invention there may be hydrogenated such compounds as the 1,10-bis(4-aminotolyl)-decanes, 1,10-bis(4-aminophenyl)decanes, 1,4-bis(4-aminophenyl) - 2,2,3,3 - tetramethylbutane, the 4,4'-diaminoditolylmethanes, bis(4-amino-3-ethylphenyl)methane, 1,2-bis(4-amino-3-ethylphenyl)ethane, 4,4' - diaminodianisylmethane, 4,4'-diaminodiphenylmethylmethane, 4,4'-diaminodiphenyldimethylmethane, 4,4' - diaminodiphenylethane - 1,2 - bis(4 - methylaminophenyl) - methane, 1,2-bis(4 - methylaminophenyl)ethane, bis(4-ethylaminophenyl)methane and the like. These and similar dicarbocyclic diamines containing a benzene nucleus are hydrogenated by the process of this invention to the corresponding dialicyclic diamines, such as 1,10-bis(4-aminocyclohexyl)decane, bis(4-amino-2-methylcyclohexyl)methane, bis(4-amino - 3 - methoxycyclohexyl)methane, 1,2 - bis(4 - methylaminocyclohexyl)ethane, 2,2 - bis(4 - aminocyclohexyl)propane, 1,2-bis(4-aminocyclohexyl)ethane, 1,1-bis-(4-aminocyclohexyl)ethane and the like.

The catalysts used in the practice of this invention contain as their active constituent finely divided nickel or cobalt. They are either (a) pyrophoric nickel or cobalt catalysts prepared by a method such that the active form of the metal is produced at temperatures below 150° C. or by reducing a salt, oxide or hydroxide of cobalt or nickel with hydrogen at temperatures in the range of 400° to 700° C. or (b) stabilized nickel or cobalt catalysts prepared by exposure of pyrophoric nickel or cobalt catalysts prepared as described above to an oxidizing atmosphere, while maintaining the catalyst mass at a temperature below 50° C.

Pyrophoric nickel and cobalt catalysts can be made by extracting with alkali, the alkali-soluble component of an alloy of nickel or cobalt with an alkali-soluble metal, or by reducing a nickel or cobalt salt with sodium naphthalene as described in U. S. Patent No. 2,177,412, issued October 24, 1939.

The nickel and cobalt catalysts can be supported or unsupported. The supporting materials can be a form of silica such as kieselguhr or they can be magnesia or alumina. The support can be added during catalyst preparation or formed during the catalyst preparation. The catalysts which give the best results are those in which the support is formed during the catalyst preparation.

The examples below illustrate typical methods for preparing the nickel and cobalt catalysts used in this invention.

*Example A*

Three hundred parts of a finely powdered alloy composed of equal parts of nickel and aluminum is added with stirring over a period of one and one-half hours to a solution of 342 parts of sodium hydroxide in 1590 parts of distilled water maintained at 50° C. The supernatant liquid is then decanted off and the catalyst washed with distilled water until free from alkali.

*Example B*

One hundred parts of finely ground cobalt-aluminum alloy containing equal parts of cobalt and aluminum is suspended with stirring in 1250 parts of boiling water. A solution of 60 parts of sodium hydroxide in 175 parts of water is added during 2 hours. Thereafter the mixture is boiled for 4 hours. The resultant finely divided product is washed with water by decantation until free from alkali. The product is pyrophoric and can be stabilized as follows:

The aqueous sludge of the product is placed in a rotating vessel. The vessel is sealed and the air exhausted by means of a vacuum pump and the mass heated under vacuum until all the free water is removed. The vessel is then cooled continuously with cold water and a small amount of air is blown through the dry mass at such a rate that the temperature of the dry mass does not exceed 50° C. After 2 hours a sample of the dry product is no longer pyrophoric. The catalyst is found by analysis to consist of 37% cobalt, of which 55% is in the elementary state, and 43% $Al_2O_3$. The catalyst therefore probably consists of partially oxidized cobalt supported on hydrated alumina.

The process of this invention may be operated in the absence or presence of a solvent. Suitable solvents are the aromatic and aliphatic hydrocarbons, such as benzene and cyclohexane; alcohols, such as methanol, ethanol, and cyclohexanol; ethers such as dioxane, and the like.

The diamines produced by the process of this invention are particularly useful for the synthesis of polyamides.

As many apparently widely different embodiments of this invention may be made without departing from the spirit and scope thereof, it is to be understood that we do not limit ourselves to the specific embodiments thereof except as defined in the appended claims.

We claim:

1. A process for obtaining dialicyclic diamines which comprises reacting with hydrogen at a temperature between 225° and 300° C. under a total pressure of at least 500 atmospheres in the presence of anhydrous ammonia and a hydrogenation catalyst selected from the group consisting of elemental nickel, elemental cobalt, elemental nickel on an inert support and elemental cobalt on an inert support, a dicarbocyclic diamine in which each carbocyclic nucleus contains 6 carbon atoms and at least one carbocyclic nucleus is a benzene nucleus, and having the carbocyclic nuclei separated by a saturated divalent acyclic hydrocarbon radical containing from 1 to 10 carbon atoms, said anhydrous ammonia being present in amount of 2 to 20 moles per mole of diamine being hydrogenated.

2. A process for obtaining dialicyclic diamines which comprises reacting with hydrogen at a temperature between 250° and 275° C. under a total pressure around 1000 atmospheres in the presence of anhydrous ammonia and a hydrogenation catalyst selected from the group consisting of elemental nickel, elemental cobalt, elemental nickel on an inert support and elemental cobalt on an inert support, a dicarbocyclic diamine in which the carbon rings are benzene nuclei and are separated by a saturated divalent acyclic hydrocarbon radical containing from 1 to 10 carbon atoms, said anhydrous ammonia being present in amount of 2 to 20 moles per mole of diamine being hydrogenated.

3. A process for obtaining dialicyclic diamines which comprises reacting with hydrogen at a temperature between 250° and 275° C. under a total pressure of at least 500 atmospheres in the presence of anhydrous ammonia and a hydrogenation catalyst selected from the group consisting of elemental nickel, elemental cobalt, elemental nickel on an inert support and elemental cobalt on an inert support, a dicarbocyclic diamine in which the carbon rings are benzene nuclei and are separated by a saturated divalent acyclic hydrocarbon radical containing from 1 to 10 carbon atoms, said anhydrous ammonia being present in amount of 4 to 16 moles per mole of diamine being hydrogenated.

4. A process for obtaining bis(4-aminocyclohexyl)methane which comprises reacting bis(4-aminophenyl)methane with hydrogen at a temperature between 225° and 300° C. under a total pressure of at least 500 atmospheres in the presence of anhydrous ammonia and a hydrogenation catalyst selected from the group consisting of elemental nickel, elemental cobalt, elemental nickel on an inert support and elemental cobalt on an inert support, said anhydrous ammonia being present in amount of 2 to 20 moles per mole of said bis(4-aminophenyl)methane.

5. A process for obtaining bis(4-aminocyclohexyl)methane which comprises reacting 4(p-aminobenzyl)cyclohexylamine with hydrogen at a temperature between 225° and 300° C. under a total pressure of at least 500 atmospheres in the presence of anhydrous ammonia and a hydrogenation catalyst selected from the group consisting of elemental nickel, elemental cobalt, elemental nickel on an inert support and elemental cobalt on an inert support, said anhydrous ammonia being present in amount of 2 to 20 moles per mole of said 4(p-aminobenzyl)cyclohexylamine.

6. A process for obtaining dialicyclic diamines which comprises reacting with hydrogen at a temperature between 225° and 300° C., under a total pressure of at least 500 atmospheres in the presence of anhydrous ammonia and a hydrogenation catalyst consisting of elemental nickel on an inert support, a dicarbocyclic diamine in which each carbocyclic nucleus contains 6 carbon atoms and at least one carbocyclic nucleus is a benzene nucleus, and having the carbocyclic nuclei separated by a saturated divalent acyclic hydrocarbon radical containing from 1 to 10 carbon atoms, said anhydrous ammonia being present in amount of 2 to 20 moles per mole of diamine being hydrogenated.

7. A process for obtaining dialicyclic diamines which comprises reacting with hydrogen at a temperature between 225° and 300° C. under a total pressure of at least 500 atmospheres in the presence of anhydrous ammonia and a hydrogenation catalyst consisting of elemental cobalt on an inert support, a dicarbocyclic diamine in which each carbocyclic nucleus contains 6 carbon atoms and at least one carbocyclic nucleus is a benzene nucleus, and having the carbocyclic nuclei separated by a saturated divalent acyclic hydrocarbon radical containing from 1 to 10 carbon atoms, said anhydrous ammonia being present in amount of 2 to 20 moles per mole of diamine being hydrogenated.

ARCHIE E. BARKDOLL.
GERALD M. WHITMAN.

REFERENCES CITED

The following references are of record in the file of this patent:

UNITED STATES PATENTS

| Number | Name | Date |
|---|---|---|
| 1,927,129 | Lommel | Sept. 19, 1933 |
| 2,092,525 | Adkins | Sept. 7, 1937 |
| 2,129,631 | Winans | Sept. 6, 1938 |
| 2,132,389 | Bertsch | Oct. 11, 1938 |

FOREIGN PATENTS

| Number | Country | Date |
|---|---|---|
| 56,448 | Netherlands | June 15, 1944 |
| 885,949 | France | Sept. 29, 1943 |

OTHER REFERENCES

Balas et al.: "Collection Czechoslovak Chem. Commun.," v. 3, pages 171–176 (1931).

WI. Ipatiew: "Ber. deut. chem.," v. 40, pages 1281–1290 (1907).

I. Ipatiew: "Compt. Rend.," v. 183, pages 973–975 (1926).

Skita et al.: "Ber. deut. chem.," v. 52, pages 1519–1535 (1919).